March 31, 1942.  R. J. L. MOINEAU  2,278,147
AIRCRAFT
Filed Sept. 7, 1938  2 Sheets-Sheet 2
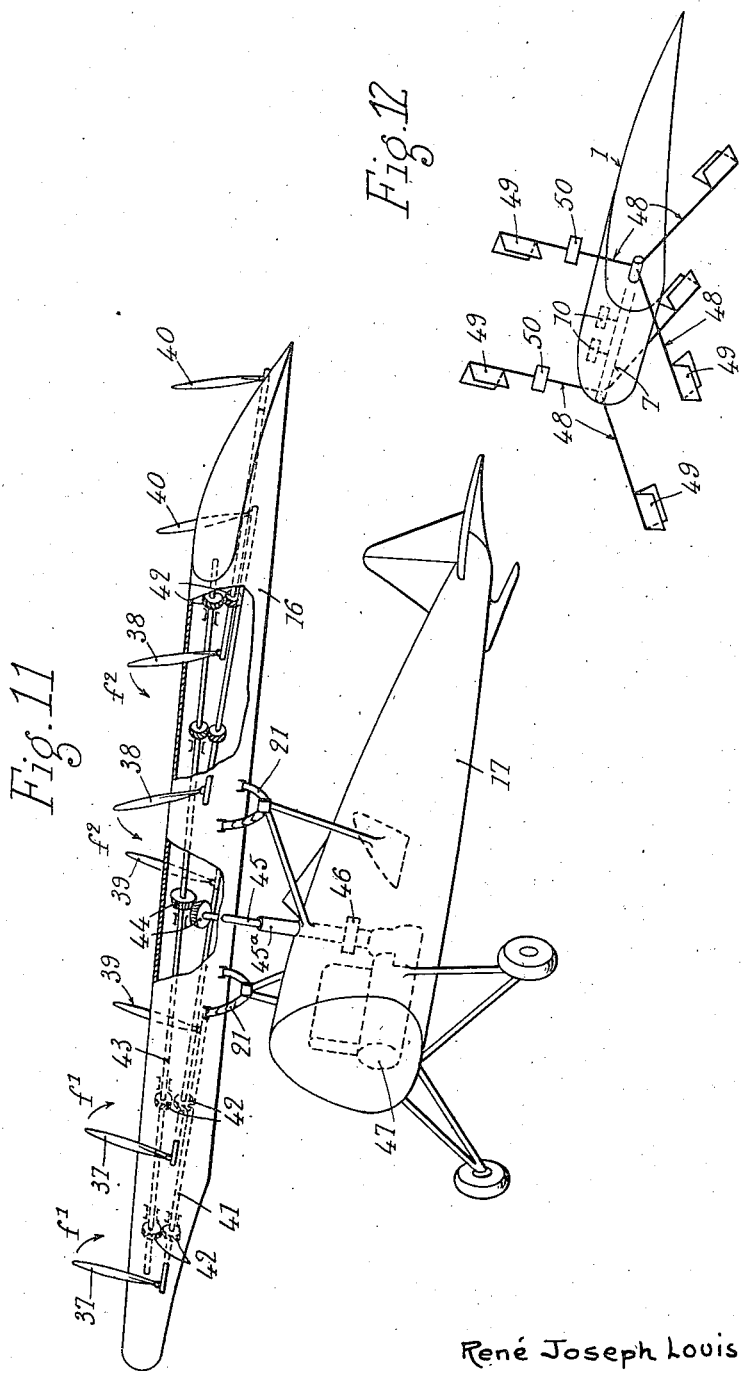
René Joseph Louis Moineau
INVENTOR
By Otto Munk
his ATT'Y.

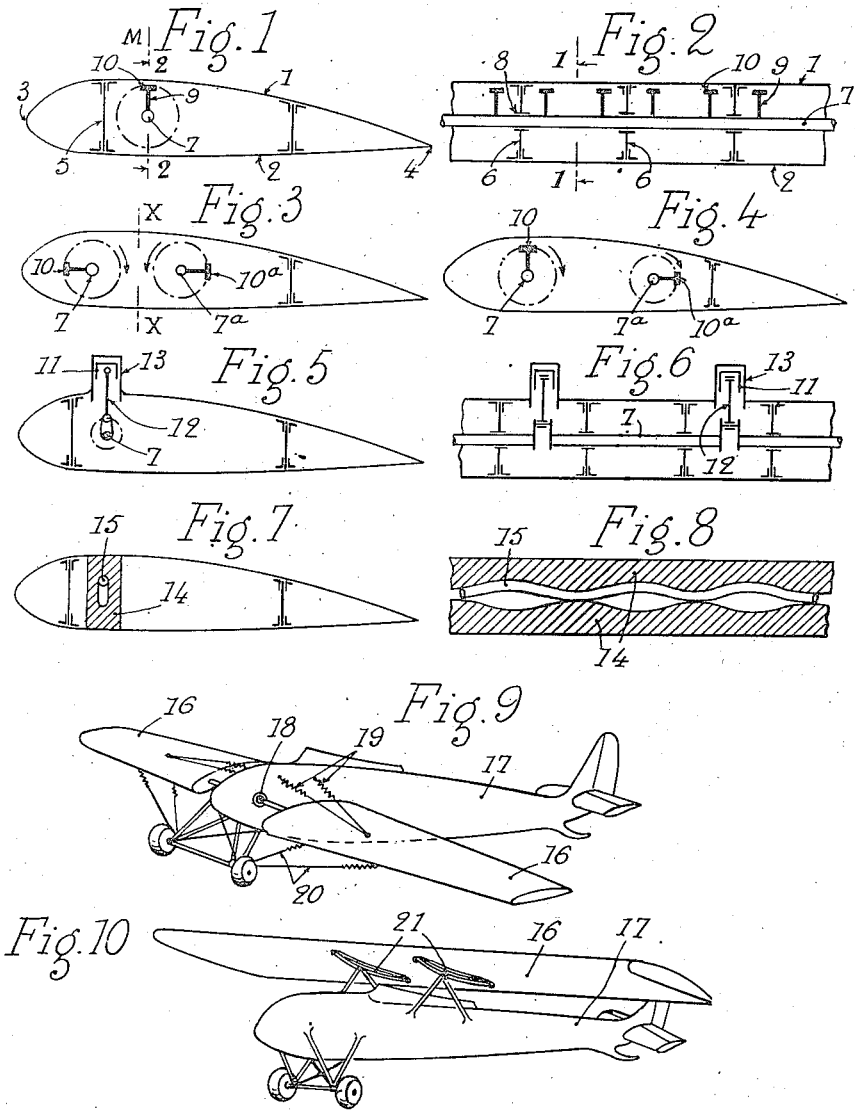

Patented Mar. 31, 1942

2,278,147

UNITED STATES PATENT OFFICE 2,278,147

AIRCRAFT

René Joseph Louis Moineau, Paris, France, assignor to Societe d'Exploitation des Brevets Moineau S. A. R. L., Luxemburg, Luxemburg Application September 7, 1938, Serial No. 228,735
In France September 20, 1937

2 Claims. (Cl. 244—22)

It is known that a wing of an ornithopter or like flying machine, which beats after the manner of a bird engaged in a flapping flight is a lifting and a self-propelling wing, i. e., a wing in which the sum of the aerodynamic resultants is inclined forwardly and can therefore, according to its inclination and its size, either provide alone for the forward movement of the wing, or aid in this movement in combination with other usual means of propulsion. It has already been proposed to make use of one or more unbalanced masses mounted on a shaft extending longitudinally of the wing and set in rotation by suitable driving means; in this case no particular attention had been paid to the form of the wings, but the different paths followed by the wing spars had been particularly considered.

I have now found that the same results can be obtained with a wing to which is given a vibratory movement of comparatively small amplitude and high frequency, provided that the wing has a profile which is thick at the leading edge and decreases gradually in thickness from the leading edge to the trailing edge, propulsive and lifting effects may be obtained.

The present invention has therefore for its object to provide a vehicle movable in a fluid, comprising one or more wings having a profile as defined above and to which may be given a vibratory motion of comparatively small amplitude and high frequency and having a component normal to wing chord, in order to increase the lift of the wing and render same self-propelling.

A further object of the invention is to provide simple and effective means for imparting to the wing or wings of the vehicle such a vibratory motion.

These means may comprise unbalanced masses supported by the wings and set in motion by an independent driving mechanism but preferably said unbalanced masses are constituted by parts of the driving mechanism itself, for instance by the pistons of internal combustion engines.

Further objects and advantages of the invention will be set forth in the following description.

The invention will now be more fully described with reference to the accompanying drawings, in which:

Fig. 1 is a cross-section, on the line 1—1 of Fig. 2, of a wing of a vehicle in conformity with the invention showing the means for setting the wing in vibration.

Fig. 2 is a longitudinal section of the same, on the line 2—2 of Fig. 1.

Fig. 3 is a cross-section of a wing comprising two groups of unbalanced rotary masses which permit of imparting to the wing an oscillating movement of translation according to a direction normal to wing chord.

Fig. 4 is a cross-section of another wing comprising two groups of unbalanced rotary masses which permit of imparting to the wing an oscillating movement about an axis situated along its span.

Figs. 5 and 6 are views analogous to Figs. 1 and 2, of a modified arrangement of the masses.

Figs. 7 and 8 are analogous views of another modification.

Figs. 9 and 10 are diagrammatic perspective views of two aeroplanes embodying the invention and showing the attachment of the wings to the main body of the aeroplane.

Fig. 11 is a diagrammatic perspective view of an aircraft in which the unbalanced masses are constituted by one-bladed air-screws.

Fig. 12 is a diagrammatic perspective view of a part of a wing on which are mounted unbalanced wind-mills.

It is to be noted that although the invention is herein described with particular reference to aircraft wing systems, it is also applicable to watercraft as such vibratory wings, when operating in water, afford also a propulsive action and might therefore be substituted for usual screw propellers.

Preferred means for setting the wings in vibration will now be described with reference to Figs. 1 to 8 of the drawings and it is to be understood that these wings must be attached to the main body of the craft so as to be free to vibrate at least in a direction normal to wing chord. Two embodiments of the attachment of the wings to an aircraft main body will be described later with reference to Figs. 9 and 10.

In the embodiment shown in Figs. 1 and 2, the wing consists in the usual manner of back surfaces 1 and pressure surfaces 2, joined together at the leading edge 3 and the trailing edge 4 and supported by a certain number of spars 5 and ribs 6. The profile of the wing is thick at the leading edge 3 and decreases in thickness from this leading edge to the trailing edge 4 according to a slope of some degrees. In the interior of the wing there is mounted a rotary shaft 7 extending in the direction of the span of the wing for instance in parallel relation with the leading edge 3. The bearings 8 of this shaft are provided in the ribs 6. To the shaft 7 are secured, by arms 9, heavy masses 10. All of the arms 9 are situated in the same radial plane, and thus the masses 10 will rotate in synchronism about the geometrical axis of the shaft. The said shaft may be rotated from the interior or the exterior of the wing, examples of which will be further indicated.

The operation is based upon the well-known mechanical principle, according to which, if a portion of a free system (the masses 10) is moved in space by means of the internal forces of the system (wing and masses), the other portion (wing) will be given a displacement in the contrary direction and of an amplitude depending upon the ratio of the weights of these two portions and upon the external forces which such displacements produce (resistance of the air, for instance).

In the present case, the wing being supposed to be free in a space empty of air, when the masses 10 rotate by the effect of the driving mechanism acting upon the shaft, the entire wing will be given a circular movement of translation having the same speed of rotation, so that the centre of gravity of the system (the sum of the masses and the wing) will be fixed in space.

In the air, the action is much more complex, and depends upon the forms of the wing, but the nearly circular movement of translation of the wing will subsist, although impeded, and the result will be an aerodynamic resultant both lifting and propelling, particularly when the wing is moving forward in the air.

In the embodiment shown in Fig. 3, two groups of equal masses 10 and 10ᵃ, mounted on respective shafts 7 and 7ᵃ, rotate in synchronism but in opposite directions, and in such manner that the masses 10 and 10ᵃ shall be constantly symmetrical with reference to a vertical plane XX parallel to the axes 7 and 7ᵃ and equidistant from these axes. In this case, the oscillation of the wing is vertical and rectilinear.

In the embodiment shown in Fig. 4, the two groups of masses 10 and 10ᵃ mounted on the respective shafts 7 and 7ᵃ, rotate in the same direction and at the same speed, but with an angular displacement. In this case, the wing is no longer displaced so as to remain parallel to itself, as the difference of phase between the two series of oscillations will produce variable torques whose axes are parallel to the span, thus giving rise to variations of incidence having the same frequency as the rotations of the shafts 7 and 7ᵃ.

The masses 10 and 10ᵃ may consist of heavy bodies of any kind, and these may have other uses at the same time; they may, for instance, consist of engine parts.

Thus in the embodiment shown in Figs. 5 and 6, the masses consist of the movable parts (piston 11, rods 12 and crankshaft 7) of engines whose cylinders 13 are secured within the wing, the movable parts being maintained in synchronism by a common shaft. It should be observed that the synchronism might be obtained by any other means such as the ignition or the valve-gear, for instance, in the case of internal combustion engines.

In the embodiment shown in Figs. 7 and 8, the wing is arranged in such manner as to form a motor of the known type consisting of two helical members or groups of members 14 and 15, one of which rotates within the other, in gear engagement, for instance of the nature described in my U. S. patent specification No. 1,892,217.

In all of the above-mentioned embodiments, the masses are situated within the wing, but it is evident that such masses, or a certain number of them, may be situated on the outside of the wing.

It is obvious that in order that the wing may oscillate, it must be free to do this with reference to the rest of the craft.

Figs. 9 and 10 are two diagrams showing the mounting of oscillating propulsive and lifting planes 16 upon an aeroplane. In these diagrams, the means for oscillating the wings have not been represented. These means may consist of either one of the arrangements shown in Figs. 1 to 8 or in Figs. 11 and 12 which will be later described.

In the embodiment shown in Fig. 9, each wing 16 is connected with the fuselage 17 by a ball-joint 18 and by elastic supports 19 and 20 which maintain it in the position of mean lift and incidence.

In the embodiment shown in Fig. 10, the single wing 16 is connected with the fuselage 17 by two leaf springs 21.

Since the oscillations of the wing will only have their full efficiency when the aircraft has attained a certain speed on its flight path, it is possible to provide known means for starting, not shown, and if necessary, these may also constitute eccentric or unbalanced masses, for instance in the form of unbalanced air-screws.

Figs. 11 and 12 illustrate further means for setting the wings of an aeroplane in vibration.

In the embodiment shown in Fig. 11, the aeroplane comprises, as in the case of Fig. 10, a single wing 16 having an unsymmetrical profile (rounded in front and pointed in the rear, for instance). The said wing is connected with the fuselage 17 by two leaf springs 21.

The propulsion and the hyperlifting effect of the wing are assured by the oscillations of this wing. Such oscillations are obtained by the rotation of front air-screws 37, 38 and rear air-screws 39, 40. Such air-screws are unsymmetrical (for instance with a single blade). They are keyed in pairs to shafts 41, situated in the direction of the width of the wing, and are driven with a continuous rotation, and preferably in contrary directions (arrows $f^1$ and $f^2$) according as they are situated on one side or the other of the vertical longitudinal plane of symmetry of the machine. They are driven for instance by pairs of helical gear wheels 42, the driving wheel of each pair being keyed to a shaft 43 situated along the span of the wing. The shaft 43 is driven, by means of a gear set 44, by a shaft consisting of two keyed parts, one of which is slidable in the other, which are connected by a free wheel mechanism 46 with the engine 47 located in the fuselage 17.

The air-screws have several functions. When driven by the engine 47, they provide for the propulsion of the aeroplane, in two different ways: by their direct action upon the the air after the manner of known air-propellers, and by the oscillations which they impart to the wing by reason of their unsymmetrical form. On the other hand, such oscillations increase the lift of the wing. On the contrary, when the wings turn in autorotation, owing to the free wheel mechanism 46 and due to the action of the relative wind upon the wings, as the wing moves forward through the air by reason of its kinetic energy, of its descent, etc., the air-screws will operate as wind mills, hence maintaining the oscillations of the wing and thus tending to maintain its forward movement and to keep up its additional lifting power.

Fig. 12 represents a wing 1 containing a rotary shaft 7, resembling the shaft shown in Fig. 1 and carrying the eccentric masses 10. To each end of the shaft is keyed a wind mill 48, each of whose arms carries a vane 49 preferably consisting of two small plates which are adapted to oscillate by a suitable drive, not shown, in such way as to form a dihedral angle which is more or less open.

It will be observed that the wind mills, when the vanes are open, will turn in autorotation in the relative wind, and thus they will act like the air-screws 37 to 40 of the preceding embodiment, and will drive the shaft 7 with the masses 10.

Each vane may itself form an eccentric mass, if it is unsymmetrical (if it has a heavy part on one side), and its effect may be increased by providing one of the arms with a mass 50. It should be noted that certain of the arms, or all of them, may carry one or more masses having the same weight or different weights, and situated at different or the same distances from the shaft 7).

Obviously, the invention is not limited to the embodiments herein described and represented, which are given solely by way of example.

Having now described my invention what I claim as new and desire to secure by Letters Patent is:

1. In a vehicle movable in a fluid, the combination of a main body, wings connected to said main body so as to be free to vibrate with a component of movement normal to wing chord, said wings having a profile which is thick at the leading edge and decreases gradually in thickness from the leading edge to the trailing edge according to a slope of some degrees, and means for imparting to said wings a vibratory motion of comparatively small amplitude and high frequency and having a component normal to wing chord, said means comprising a plurality of unbalanced air-screws distributed over the span of the wings and connected together so as to rotate in synchronism and arranged to be operated by the relative current of fluid when the vehicle is travelling.

2. An aircraft as claimed in claim 1, further comprising driving means carried by said main body, and a connection including a free wheel mechanism for driving said air-screws from said driving means.

RENÉ JOSEPH LOUIS MOINEAU.